(12) United States Patent
Benchikhi

(10) Patent No.: US 10,269,330 B2
(45) Date of Patent: Apr. 23, 2019

(54) VEHICLE INTERIOR EQUIPMENT WITH A SCREEN, CORRESPONDING MANAGEMENT PROCESS

(71) Applicant: Faurecia Interieur Industrie, Nanterre (FR)

(72) Inventor: Zakaria Benchikhi, Paris (FR)

(73) Assignee: Faurecia Interieur Industrie, Nanterre (FR)

( * ) Notice: Subject to any disclaimer, the term of this patent is extended or adjusted under 35 U.S.C. 154(b) by 0 days.

(21) Appl. No.: 15/373,146

(22) Filed: Dec. 8, 2016

(65) Prior Publication Data

US 2017/0162176 A1 Jun. 8, 2017

(30) Foreign Application Priority Data

Dec. 8, 2015 (FR) ...................................... 15 62008

(51) Int. Cl.
| | |
|---|---|
| *G09G 3/34* | (2006.01) |
| *G09G 5/10* | (2006.01) |
| *G09G 5/36* | (2006.01) |
| *B60Q 3/14* | (2017.01) |
| *B60Q 3/18* | (2017.01) |

(Continued)

(52) U.S. Cl.
CPC ............... *G09G 5/36* (2013.01); *B60K 35/00* (2013.01); *B60K 37/04* (2013.01); *B60Q 3/14* (2017.02); *B60Q 3/18* (2017.02); *G09G 3/3406* (2013.01); *G09G 3/3473* (2013.01); *G09G 5/10* (2013.01); *B60K 2350/2043* (2013.01); *B60K 2350/2069* (2013.01); *B60K 2350/2082* (2013.01); *B60K 2350/2095* (2013.01); *B60K 2350/352* (2013.01); *B60K 2350/406* (2013.01); *G09G 2330/027* (2013.01); *G09G 2360/144* (2013.01); *G09G 2360/16* (2013.01); *G09G 2380/10* (2013.01)

(58) Field of Classification Search
CPC .... B60K 2350/2043; B60K 2350/2069; B60K 2350/2082; B60K 2350/2095; B60K 2350/352; B60K 2350/406; B60K 35/00; B60K 37/04; B60Q 3/14; B60Q 3/18; G09G 2320/062; G09G 2320/0626; G09G 2360/16; G09G 2380/10; G09G 3/3406; G09G 3/3473; G09G 5/10; G09G 5/36
See application file for complete search history.

(56) References Cited

U.S. PATENT DOCUMENTS

| | | | | |
|---|---|---|---|---|
| 2012/0140499 | A1* | 6/2012 | Jones | .................... G01D 13/00 362/489 |
| 2017/0024201 | A1* | 1/2017 | Diedrich | ................... G06F 8/65 |

FOREIGN PATENT DOCUMENTS

| | | | | |
|---|---|---|---|---|
| DE | 102004010286 A1 | * | 12/2005 | ............. B60R 13/02 |
| FR | 2824510 A1 | * | 11/2002 | ............. B60K 35/00 |

OTHER PUBLICATIONS

Preliminary Search Report in French for application No. FR1562008, dated Aug. 10, 2016, 2 pages.

* cited by examiner

*Primary Examiner* — LaTanya Bibbins
(74) *Attorney, Agent, or Firm* — Reising Ethington P.C.

(57) ABSTRACT

Vehicle interior equipment that includes a structure having a window surrounded by an edge area, and an electronic display screen placed in the window. In a standby condition of the screen, the screen displays a decorative image coordinated with the decoration of the edge area so that at least the peripheral area of the screen and the edge area coincide visually.

13 Claims, 1 Drawing Sheet

(51) Int. Cl.
*B60K 35/00* (2006.01)
*B60K 37/04* (2006.01)

VEHICLE INTERIOR EQUIPMENT WITH A SCREEN, CORRESPONDING MANAGEMENT PROCESS

TECHNICAL FIELD

The invention generally relates to interior equipment of vehicles equipped with electronic display screens.

More specifically, the invention according to a first aspect relates to an interior equipment of a vehicle of the type comprising:
- a structure having a visible external surface, a window being cut out in the external surface, the window being surrounded by an edge area of the external surface;
- an electronic display screen placed in the window and having a peripheral area adjacent to the edge area; and
- a control circuit or other device that manages or otherwise operates the electronic display screen.

BACKGROUND

Automobile manufacturers impose that the electronic display screens be invisible when they are inactive. Such an effect is known under the term of "black panel" effect, i.e. a black panel. Indeed, the switched off screen has a uniform black surface, which merges into the external surface when the latter bears a uniform black decoration.

However, the camouflage of the screen is difficult to make when the external surface does not bear any uniform black decoration.

SUMMARY

In this context, the invention aims at proposing a piece of vehicle interior equipment in which the electronic display screen may be camouflaged even if the external surface bears a decoration which is not uniformly black.

For this purpose, the invention relates to a vehicle interior equipment of the aforementioned type, wherein the edge area bears a visible decoration, the control circuit (management device) being configured to selectively place the electronic display screen in an active state wherein the pieces of information are displayed on the electronic display screen or in a standby state in which a decorative image is displayed on the electronic display screen, the decorative image being coordinated with the visible decoration so that at least the peripheral area of the screen and the edge area coincide visually.

Because the decorative image is coordinated with the visible decoration borne by the edge area, the passengers do not see any discontinuity between the decoration of the edge area and the screen. The electronic display screen is therefore camouflaged.

The visible decoration of the edge area is of any type. For example it is plain or colored, or includes patterns of any kind, either colored or non-colored. The visible decoration is for example figurative or alternatively is non-figurative.

Thus, it is particularly easy to adapt the electronic display screen to various vehicle versions, the external surfaces of which are decorated in different ways. For this it is sufficient to record or otherwise store in the control circuit a decorative image coordinated with the decoration provided for the external surface. This is fast and easy.

The vehicle interior equipment may also have one or several of the features below, considered individually or according to all the technically possible combinations:

- the control circuit stores a plurality of decorative images different from each other, each may be displayed on the electronic display screen in the standby condition;
- the interior equipment comprises an optical film having at least one first area covering the edge area and a second area covering the electronic display screen, the first area having a first light transmission rate, the second area having a second light transmission rate less than the first light transmission rate;
- the electronic display screen is of electronic paper type;
- the interior equipment comprises a light source placed under the external surface and laid out for diffusing light radiation through the external surface;
- the control circuit is configured for controlling the light source, so that the light source diffuses into the vehicle a first edge-diffused light intensity when the electronic display screen is in its active condition, and a second edge-diffused light intensity greater than the first when the electronic display screen is in its standby condition;
- the control circuit is configured to, at least in the standby condition of the electronic display screen:
  estimate a light intensity reflected by the edge area;
  estimate a light intensity reflected by the electronic display screen;
  regulate the electronic display screen so that the latter diffuses into the vehicle a determined diffused screen light intensity; and
  regulate the light source so that the latter diffuses into the vehicle a determined edge-diffused light intensity;
  wherein the diffused screen light intensity and the edge-diffused light intensity are selected so that the following relationship is satisfied:

$|(IR_e+ID_e)-(IR_b+ID_b)| \leq 10\%(IR_b+ID_b);$ and
  the control circuit is configured to, at least in the standby condition of the electronic display screen:
  estimate a light intensity reflected by the edge area;
  estimate a light intensity reflected by the electronic display screen; and
  regulate the electronic display screen so that the latter diffuses into the vehicle a determined diffused screen light intensity;
  wherein the diffused screen light intensity is selected so that the following relationship is satisfied:

$|(IR_e+ID_e)-(IR_b)| \leq 10\%(IR_b ID_b).$

According to a second aspect, the invention deals with a method for managing an interior equipment having the features above and comprising the following steps:
  estimating a light intensity reflected by the edge area;
  estimating a light intensity reflected by the electronic display screen;
  regulating the electronic display screen so that the latter diffuses into the vehicle a determined diffused screen light intensity;
  regulating the light source so that the latter diffuses into the vehicle a determined edge-diffused light intensity;
  wherein the diffused screen light intensity and the edge-diffused light intensity are selected so that the following relationship is satisfied:

$|(IR_e+ID_e)-(IR_b+ID_b)| \leq 10\%(IR_b+ID_b).$

According to a third aspect, the invention deals with another method for managing an interior equipment having the features above, and comprising the following steps:

estimating a light intensity reflected by the edge area;
estimating a light intensity reflected by the electronic display screen;
regulating the electronic display screen so that the latter emits into the vehicle a determined diffused screen light intensity;
wherein the diffused screen light intensity is selected so that the following relationship is satisfied:

$$|(IR_e+ID_e)-(IR_b)| \leq 10\%(IR_b).$$

BRIEF DESCRIPTION OF THE DRAWINGS

Other features and advantages of the invention will become apparent from the detailed description which is given thereof below, as an indication and by no means as a limitation, with reference to the appended figures, wherein.

DETAILED DESCRIPTION

Figure 1:
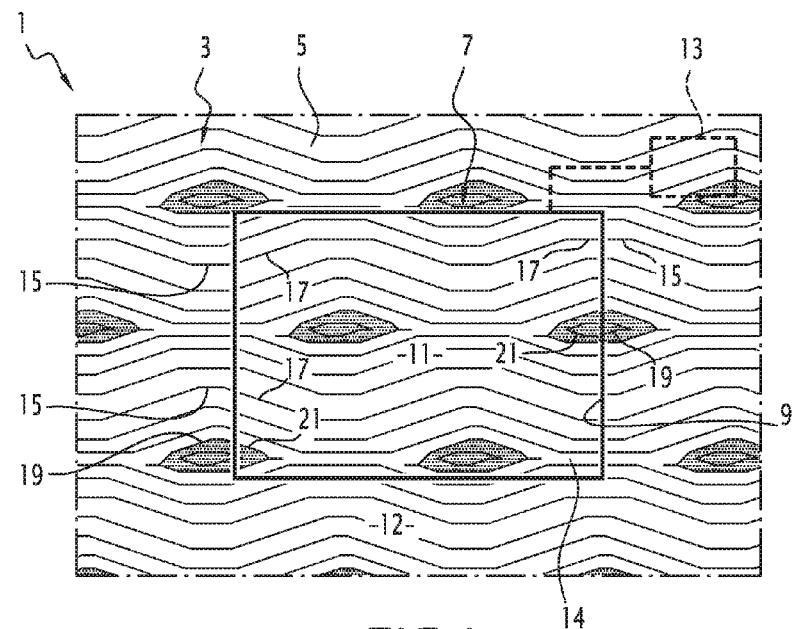
FIG. 1 is a simplified schematic illustration of a portion of a piece of vehicle interior equipment according to an embodiment of the invention, the screen being illustrated in the standby condition.
Figure 2:
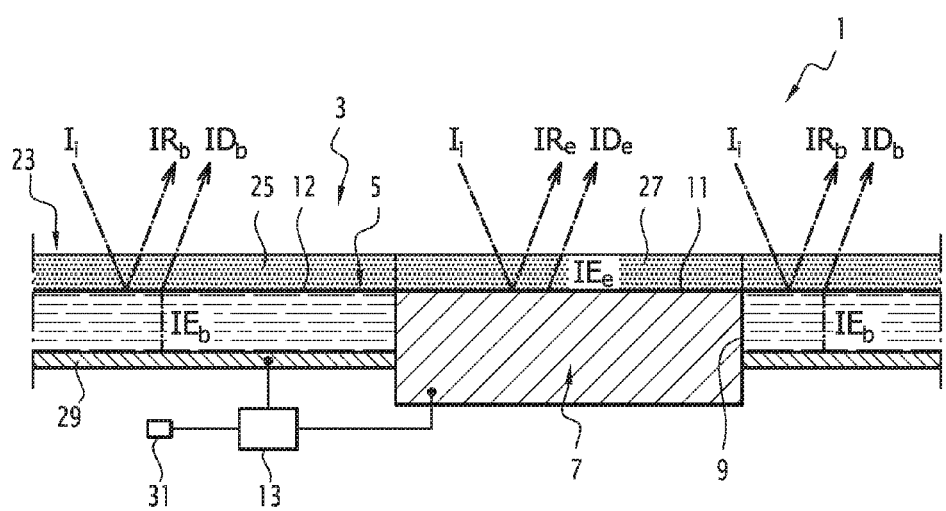
FIG. 2 is a simplified sectional view of an embodiment of the piece of interior equipment of the invention.

The interior equipment 1 illustrated in FIG. 1 is typically a vehicle dashboard. The vehicle is an automobile vehicle, for example a car or a truck.

Alternatively, the interior equipment is a trim of an opening of the vehicle or of a central console, or of any other piece of equipment intended to be implanted into the passenger compartment of the vehicle.

The interior equipment 1 comprises a structure 3 having an external surface 5 visible to the passengers of the vehicle, and an electronic display screen 7.

The structure 3 is for example the cap of the dashboard. The external surface 5 is turned towards the passenger compartment of the vehicle.

A window 9 is cut out in the external surface 5, the electronic display screen 7 being placed in the window 9.

Typically, the electronic display screen 7 is placed under the external surface 5, that is to say, towards the inside of the structure 3. The electronic display screen 7 comprises an active display area 11 with a matrix of pixels, this area 11 being included in the window 9. It also comprises other members, which are hidden under the active area 11 or under the external surface 3.

The window 9 is typically with a closed contour and has any suitable shape, for example a rectangular shape. The active area 11 substantially has the same shape and the same dimensions as the window 9.

The external surface 5 includes an edge area 12, which surrounds the window 9. The edge area 12 borders the window 9 and extends as far as the window 9, all around the latter.

The edge area 12 bears a visible decoration, which is of any type. This decoration is for example of one color, or bicolor, or includes several colors. For example it is plain, or on the contrary includes patterns. The patterns are figurative or on the contrary non-figurative.

For example, the decoration mimics wood or any other material such as leather.

The decoration is made in any suitable way, by using inserts in plastic material or a layer of real wood, etc.

The interior equipment 1 further includes a device 13 for operating or otherwise managing the electronic display screen 7. This management device 13 is an electronic control circuit that, for example, comprises an information processing unit formed with a processor and with a memory associated with the processor, or comprises programmable logic components such as FPGAs (Field-Programmable Gate Array) or further dedicated integrated circuits such as ASICs (Application-Specific Integrated Circuit).

The management device 13 is configured for controlling the electronic display screen 7. More specifically, it is configured for selectively placing the electronic display screen 7 in an active condition in which pieces of information are displayed on the electronic display screen 7, or in a standby condition.

The information is displayed on the active area 11 of the screen. For example it relates to the operation of the vehicle (speed of the vehicle, engine rotational speed, remaining volume of fuel in the tank, temperature of the coolant liquid of the engine . . . ). Additionally or alternatively, the displayed pieces of information include warnings relating to the operation or to the condition of the vehicle. Alternatively or additionally, the pieces of information relating to the operation or to the condition of certain circuits of the vehicle, such as the ventilation or air-conditioning circuit for the passenger compartment of the vehicle. These pieces of information, additionally or alternatively, relate to the environment of the vehicle: exterior temperature, time, etc.

The management device 13 is configured for, in the standby condition of the electronic display screen 7, displaying a decorative image on the electronic display screen 7, this decorative image being coordinated with the visible decoration of the edge area 12.

More specifically, the electronic display screen 7 has a peripheral area 14 adjacent to the edge area 12. This area 14 corresponds to the periphery of the active area 11. It extends all around the active area 11.

The decorative image is selected so that at least the peripheral area 14 of the screen 7 and the edge area 12 coincide visually.

The decorative image is preferably selected so as to make the electronic display screen 7 invisible for the passengers of the vehicle.

The decorative image is included and is in the continuity of the visible decoration borne by the edge area. Typically, when the visible decoration includes lines 15 extending up to the edge of the window 9, the decorative image includes other lines 17 extending the lines 15. When the visible decoration includes colored spots 19 extending up to the edge of the window 9, the decorative image includes other spots 21, of the same color or substantially of the same color as the spots 19 which border and extend the color spots 19.

If the visible decoration of the edge area 12 is a portion of a figurative image, the decorative image includes another portion of the same figurative image, like a puzzle part.

Preferably, the visible decoration is of the random type. In other words, it includes patterns which are not positioned according to a regular layout. Preferably, it includes a large number of colors. In this case, the decorative image is itself also random and preferably includes itself also a large number of different colors. This type of decoration facilitates camouflage of the electronic display screen 7 within the external surface 12.

Advantageously, the management device 13 stores a plurality of decorative images different from each other, each may be displayed on the electronic display screen 7 in the standby condition.

One or several of the decorative images are selected for making the electronic display screen 7 invisible, as described above. For example, other decorative images are not selected for making the display screen invisible, but rather for giving an attractive aspect to the external surface 5.

In this case, the management device 13 advantageously includes an interface which may be used by the passengers of the vehicle, and giving the possibility of selecting the image or the displayed decorative images during the standby condition of the display screen.

Typically, the interior equipment 1 is laid out so that the luminosity of the external surface 5 is close to or identical with the luminosity of the electronic display screen 7, when this screen is in the standby condition.

To do this, according to a first embodiment, the piece of interior equipment 1 comprises an optical film 23 having at least one first area 25 covering the edge area 12, and a second area 27 covering the electronic display screen 7.

The optical film 23 is a translucent material, for example a plastic material. The first area 25 has a first light transmission rate, and the second area 27 has a second light transmission rate greater than the first light transmission rate.

The optical film 23 may further comprise an additional coating. This additional coating having optical and/or mechanical properties, such as anti-reflective, anti-scratch properties.

Indeed, at the electronic display screen 7, the emitted intensity of the light corresponds to the sum of two terms: the light intensity emitted by the screen and transmitted through the decorative film, and the incident light intensity reflected by the screen. At the edge area 12, in the first embodiment of the invention, the intensity of the light emitted by the edge area 12 corresponds to the incident radiation intensity reflected by the edge area 12. If the intensity of the incident radiation is noted as $I_i$, and the intensity of the reflected radiation by the edge area 12 is noted as $IR_b$, the intensity of the radiation reflected by the screen as $IR_e$, the intensity of the light emitted by the screen, as $IE_e$, and the intensity of the light diffused by the screen in the passenger compartment of the vehicle as $ID_e$, it is possible to write the following equations:

$$IR_b = I_i(t_b t_{rb} t_b) \quad (1)$$

$$IR_e = I_i(t_e t_{re} t_e) \quad (2)$$

$$ID_e = IE_e(t_e) \quad (3)$$

wherein $t_b$ is the first light transmission rate, $t_e$ is the second light transmission rate, and $t_b$ is the light reflection rate on the edge surface and $t_{re}$ is the light reflection rate on the screen.

It is seen that reducing the second light transmission rate $t_e$, relatively to the first light transmission rate $t_b$ leads to reduction of the terms $IR_e$ and $ID_e$ relatively to the term $IR_b$. In other words, reducing the second light transmission rate gives the possibility of bringing closer to each other the luminosity of the screen and the luminosity of the edge area.

The different intensities mentioned above are all intensities per unit surface.

Alternatively, or in addition to the fact of having an optical film with a reduced light transmission rate on the edge area of the screen, in a second embodiment, the electronic display screen 7 is advantageously of the electronic paper type.

Electronic paper is also called electronic ink or "E-paper". This display technique is known and will therefore not be described in detail here. It is sufficient to specify that this display technique does not require any energy for leaving a displayed text or image. Unlike the conventional display techniques, electronic paper is purely reflective and uses the ambient light in the same way as the conventional paper. Thus, the term $ID_e$ is zero or substantially zero when the screen is of the electronic paper type.

Alternatively, the electronic display screen is of another type: LED, or any other suitable type.

In addition to having an optical film having a reduced light transmission rate on the edge area of the screen and/or of having an electronic display screen of the electronic paper type, or in the place of both of these embodiments, in a third embodiment, the interior equipment 1 comprises a light source 29 placed under the external surface 5 and laid out for diffusing light radiation through the external surface 5.

The light source 29 is of any suitable type. For example, it is an array of optical fibers, or light guide, or a plurality of diodes, etc.

The light source 29 is laid out so as to diffuse light radiation through the edge area 12. For example, the light radiation is substantially uniform over the whole edge area 12.

In another embodiment, the light radiation is not uniform. The light radiation is maximum at the window 7 and decreases upon moving away from the window 7 along the edge area 12.

In this case, the external surface 5 is in a selected material for allowing light radiation transmission. For example, the external surface 5 is a translucent material, with a strong light absorption rate.

The management device 13 is configured for controlling the light source 29, so that the light source 29 diffuses in the vehicle a first edge-diffused light intensity when the electronic display screen 7 is in its active condition, and a second edge-diffused light intensity greater than the first when the electronic display screen 7 is in its standby condition.

Typically, the light source 29 is switched off in the active condition of the electronic display screen 7, the first edge-diffused light intensity therefore being zero.

However, the second edge-diffused light intensity is non-zero. Thus, the light intensity emitted by the edge area 12 is increased, which allows compensation for the light intensity emitted by the screen in the standby condition.

According to an alternative of the third embodiment, the management device 13 is configured for, at least in the standby condition of the electronic display screen, applying the following method:

estimating the intensity $IR_b$ of the light reflected by the edge area 12;

estimating the intensity $IR_e$ of the light reflected by the electronic display screen 7;

controlling the electronic display screen 7 so that the latter diffuses into the vehicle a determined diffused screen light intensity $ID_e$;

controlling the light source so that the latter diffuses into the vehicle a determined edge-diffused light intensity $ID_b$.

The diffused screen light intensity $ID_e$ and the edge-diffused light intensity $ID_b$ are selected so that the following relationship is satisfied:

$$|(IR_e + ID_e) - (IR_b + ID_b)| \leq 10\%(IR_b + ID_b) \quad (4)$$

In other words, the management device 13 controls the light intensity diffused by the electronic display screen 7 and the light intensity diffused by the light source 29 so that the electronic display screen 7 and the edge area 12 seem to emit the same light intensity, as seen by the passengers of the vehicle.

The intensity of the reflected light $IR_b$ by the edge area 12 is estimated in any suitable way. For example, the interior equipment is equipped with a luminosity sensor 31. The latter measures the incident light intensity $I_i$ at the external surface 5, and more specifically at the edge area 12. It transmits this value to the management device 13.

The latter infers therefrom the intensity of the light reflected by the edge area $IR_b$ and the intensity of the light reflected by the electronic display screen $IR_e$ by means of equations (1) and (2) indicated above.

The values of $t_b$, $t_{rb}$, $t_e$ and $t_{re}$ are for example parameters recorded in the memory of the management device 13.

The management device 13 controls the diffused screen light intensity $ID_e$ by means of the equation (3) determined above. It selects the light intensity emitted by the screen $IE_e$, in order to obtain the sought value of $ID_e$, $t_e$, being a parameter recorded in the memory of the management device 13.

Also, the management device 13 controls the edge-diffused light intensity $ID_b$ by means of the following equation:

$$ID_b = IE_b t_b t_s$$

wherein $t_b$ is the light transmission rate through the first area of the optical film, and $t_s$ is the light transmission rate through the external surface 5, and more specifically through the edge area 12. $IE_b$ is the light intensity emitted by the light source 29. $t_b$ and $t_s$ are numerical parameters recorded in the memory of the management device 13.

Alternatively, the diffused screen light intensity and the edge-diffused light intensity are selected so that the following relationship is satisfied:

$$|(IR_e + ID_e) - (IR_b + ID_b)| \leq 5\%(IR_b ID_b)$$

$$|(IR_e + ID_e) - (IR_b + ID_b)| \leq 1\%(IR_b + ID_b)$$

When the interior equipment 1 does not comprise any optical film 23, equations (1) to (4) always apply, but $t_e$, and $t_b$ are equal to 1.

A fourth embodiment of the invention will now be described. It may be used in addition to the first and/or second and/or third embodiments, or instead of the latter.

According to the fourth embodiment, the management device 13 is configured for, at least in the standby condition of the electronic display screen 7, applying the following method:
estimating a light intensity $IR_b$ reflected by the edge area 12;
estimating a light intensity $IR_e$ reflected by the electronic display screen 7;
controlling the electronic display screen 7 so that the latter diffuses into the vehicle a determined diffused screen light intensity $ID_e$.

The diffused light intensity $ID_e$ is selected so that the following relationship is satisfied:

$$|(IR_e + ID_e) - (IR_b)| \leq 10\%(IR_b).$$

Preferably, this diffused screen light intensity is selected so that the following relationship is satisfied:

$$|(IR_e + ID_e) - (IR_b)| \leq 5\%(IR_b)$$

or further preferably so that the following relationship is satisfied:

$$(IR_e + ID_e) - (IR_b)| \leq 1\%(IR_b).$$

The light intensity reflected by the edge area $IR_b$ and the light intensity reflected by the electronic display screen $IR_e$ are determined as previously, by calculation by using the equations (1) and (2) above. The incident light intensity $I_i$, is determined as previously, for example by means of a sensor 31.

The diffused screen light intensity $ID_e$ is determined as previously, by calculation, by using equation (3) above. The management device 13 controls the electronic display screen 7 so that the latter emits an emitted light intensity $IE_e$ giving the possibility of obtaining the sought value of $ID_e$.

The invention claimed is:

1. A vehicle interior equipment, the interior equipment comprising:
   a structure having a visible external surface, a window formed in the external surface, the window being surrounded by an edge area of the external surface;
   an electronic display screen placed in the window and having a peripheral area adjacent to the edge area;
   an electronic control circuit that operates the electronic display screen; and
   a light source placed under the external surface and laid out for diffusing light radiation through the edge area of the external surface,
   wherein the edge area bears a visible decoration, the control circuit being configured to selectively place the electronic display screen in an active condition in which information is displayed on the electronic display screen, or in a standby condition in which a decorative image is displayed on the electronic display screen, the decorative image being coordinated with the visible decoration so that at least the peripheral area of the electronic display screen and the edge area coincide visually, and
   wherein the interior equipment is configured so that a luminosity of the external surface is substantially the same as a luminosity of the electronic display screen when the electronic display screen is in the standby condition.

2. The vehicle interior equipment according to claim 1, wherein the control circuit stores a plurality of decorative images different from each other, each may be displayed on the electronic display screen in the standby condition.

3. The vehicle interior equipment according to claim 1, further comprising an optical film having at least one first area covering the edge area and a second area covering the electronic display screen, the first area having a first light transmission rate, the second area having a second light transmission rate of less than the first light transmission rate.

4. The vehicle interior equipment according to claim 1, wherein the electronic display screen is of the electronic paper type.

5. The vehicle interior equipment according to claim 1, wherein the control circuit is configured to control the light source, so that the light source diffuses into the vehicle a first edge-diffused light intensity when the electronic display screen is in its active condition, and a second edge-diffused light intensity greater than the first when the electronic display screen is in its standby condition.

6. The vehicle interior equipment according to claim 1, wherein the control circuit is configured to, at least in the standby condition of the electronic display screen:
   estimate a light intensity $IR_b$ reflected by the edge area;
   estimate a light intensity $IR_e$ reflected by the electronic display screen;

regulate the electronic display screen so that the latter diffuses into the vehicle a determined diffused screen light intensity $ID_e$; and regulate the light source so that the latter diffuses into the vehicle a determined edge-diffused light intensity $ID_b$;

wherein the diffused screen light intensity $ID_e$ and the edge-diffused light intensity $ID_b$ are selected so that the following relationship is satisfied:

$$|(IR_e+ID_e)-(IR_b+ID_b)|\leq 10\%(IR_b ID_b).$$

7. A method for managing an interior equipment according to claim 1, the method being applied at least in the standby condition of the electronic display screen, and comprising the following steps:

estimating a light intensity $IR_b$ reflected by the edge area;

estimating a light intensity $IR_e$ reflected by the electronic display screen;

regulating the electronic display screen so that the latter diffuses into the vehicle a determined diffused screen light intensity $ID_e$; and regulating the light source so that the latter diffuses into the vehicle a determined edge-diffused light intensity $ID_b$;

wherein the diffused screen light intensity $ID_e$ and the edge-diffused light intensity are selected so that the following relationship is satisfied:

$$|(IR_e+ID_e)-(IR_b+ID_b)|\leq 10\%(IR_b+ID_b).$$

8. The vehicle interior equipment according to claim 1, wherein the control circuit is configured to, at least in the standby condition of the electronic display screen:

estimate a light intensity $IR_b$ reflected by the edge area;

estimate a light intensity $IR_e$ reflected by the electronic display screen; and regulate the electronic display screen so that the latter diffuses into the vehicle a determined diffused screen light intensity $ID_e$;

wherein the diffused screen light intensity $ID_e$ is selected so that the following relationship is satisfied:

$$|(IR_e+ID_e)-(IR_b)|\leq 10\%(IR_b).$$

9. A method for managing an interior equipment according to claim 1, the method being applied at least in the standby condition of the electronic display screen, and comprising the following steps:

estimating a light intensity $IR_b$ reflected by the edge area;

estimating a light intensity $IR_e$ reflected by the electronic display screen; and regulating the electronic display screen so that the latter emits in the vehicle a determined diffused screen light intensity $ID_e$;

wherein the diffused screen light intensity $ID_e$ is selected so that the following relationship is satisfied:

$$|(IR_e+ID_e)-(IR_b)|\leq 10\%(IR_b).$$

10. A vehicle interior equipment, the interior equipment comprising:

a structure having a visible external surface, a window formed in the external surface, the window being surrounded by an edge area of the external surface;

an electronic display screen placed in the window and having a peripheral area adjacent to the edge area;

an electronic control circuit that operates the electronic display screen; and an optical film having at least one first area covering the edge area and a second area covering the electronic display screen, the first area having a first light transmission rate, the second area having a second light transmission rate of less than the first light transmission rate, wherein the edge area bears a visible decoration, the control circuit being configured to selectively place the electronic display screen in an active condition in which information is displayed on the electronic display screen, or in a standby condition in which a decorative image is displayed on the electronic display screen, the decorative image being coordinated with the visible decoration so that at least the peripheral area of the electronic display screen and the edge area coincide visually.

11. The vehicle interior equipment according to claim 10, wherein the interior equipment is configured so that a luminosity of the external surface is substantially the same as a luminosity of the electronic display screen when the electronic display screen is in the standby condition.

12. A vehicle interior equipment, the interior equipment comprising:

a structure having a visible external surface, a window formed in the external surface, the window being surrounded by an edge area of the external surface;

an electronic display screen placed in the window and having a peripheral area adjacent to the edge area; and an electronic control circuit that operates the electronic display screen;

wherein the edge area bears a visible decoration, the control circuit being configured to selectively place the electronic display screen in an active condition in which information is displayed on the electronic display screen, or in a standby condition in which a decorative image is displayed on the electronic display screen, the decorative image being coordinated with the visible decoration so that at least the peripheral area of the electronic display screen and the edge area coincide visually, and wherein the control circuit is configured to, at least in the standby condition of the electronic display screen:

estimate a light intensity $IR_b$ reflected by the edge area;

estimate a light intensity $IR_e$ reflected by the electronic display screen; and regulate the electronic display screen so that the latter diffuses into the vehicle a determined diffused screen light intensity $ID_e$;

wherein the diffused screen light intensity $ID_e$ is selected so that the following relationship is satisfied:

$$|(IR_e+ID_e)-(IR_b)|\leq 10\%(IR_b).$$

13. The vehicle interior equipment according to claim 12, wherein the interior equipment is configured so that a luminosity of the external surface is substantially the same as a luminosity of the electronic display screen when the electronic display screen is in the standby condition.

* * * * *